United States Patent
Swam et al.

(10) Patent No.: US 7,565,052 B2
(45) Date of Patent: *Jul. 21, 2009

(54) WDM SYSTEMS AND METHODS

(75) Inventors: Steven M. Swam, Shakopee, MN (US); James A. Dorenkamp, Shakopee, MN (US); Jennifer L. Miller, Farmington, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/930,248

(22) Filed: Oct. 31, 2007

(65) Prior Publication Data

US 2008/0212967 A1    Sep. 4, 2008

Related U.S. Application Data

(63) Continuation of application No. 10/938,417, filed on Sep. 9, 2004, now Pat. No. 7,302,149.

(51) Int. Cl.
*G02B 6/00* (2006.01)

(52) U.S. Cl. ............... 385/137; 385/132; 385/134; 385/135

(58) Field of Classification Search ............ 385/132, 385/134, 135, 137
See application file for complete search history.

(56) References Cited

U.S. PATENT DOCUMENTS

| | | | |
|---|---|---|---|
| 5,758,003 A | 5/1998 | Wheeler et al. | |
| 6,504,988 B1 | 1/2003 | Trebesch et al. | |
| 6,748,155 B2 | 6/2004 | Kim et al. | |
| 7,302,149 B2 * | 11/2007 | Swam et al. | 385/134 |
| 2002/0181896 A1 | 12/2002 | McClellan et al. | |
| 2003/0007767 A1 | 1/2003 | Douglas et al. | |
| 2005/0191056 A1 | 9/2005 | Coffey | |

FOREIGN PATENT DOCUMENTS

EP    0 667 690 A2    8/1995

OTHER PUBLICATIONS

8-Channel CWDM MUX or DEMUX, *TSUNAMi®*, 2 pages, (© 2003).
Coarse Wavelength Division Multiplexer—CWDM > 8 channel mux/demux, *Cube Optics AG*, 2 pages (2004).
evertz, *7705CWDM Block Diagrams and 7705CWDM Rear Panels*, 1 page (admitted prior art).
Force, Incorporated, *Application Note 136A—SPECTRALinx® DWDM/CWDM Modules & ITU Channels*, 6 pages (Apr. 2003).
Telecast Fiber Systems Inc., *Preliminary Data Sheet CWDM, Coarse Wavelength-Division Multiplexing for the Viper II*, 1 page, (© 2002).
Telecast Fiber Systems Inc., *Preliminary Product Information—MAMBA by Telecast*, 2 pages, (© 2004).

* cited by examiner

*Primary Examiner*—James P Hughes
(74) *Attorney, Agent, or Firm*—Merchant & Gould PC (57) ABSTRACT

A WDM optical system including a media converter module including a plurality of converter cards, each converter card being configured to convert a native signal into an optical signal. The system also includes a panel bracket having an opening and a plurality of fingers, and a cable management panel including a drawer having an interior space. The cable management panel includes a splitter/combiner module mounted in the interior space, and the cable management panel is positioned in the opening of the panel bracket so that a space is defined between the cable management panel and the media converter module.

5 Claims, 8 Drawing Sheets

WDM SYSTEMS AND METHODS

TECHNICAL FIELD

The present invention relates to wavelength division multiplexed optical networks.

BACKGROUND

Wavelength division multiplexed (WDM) optical networks are known where light of multiple wavelengths is dispersed such that each wavelength of light is spatially separated from every other wavelength of light. A plurality of signals having wavelengths of different lengths can be combined for transmission over a single fiber optic cable. For optical transmission systems such as in a backbone network with a great demand for communication, a further increase in capacity has been found by reducing the optical wavelength spacing of a plurality of signal channels to increase the degree of multiplexing. WDM processing with a higher degree of multiplexing is called dense wavelength division multiplexing (DWDM).

Also, it is known in optical transmission systems in which there is less demand for communication that the degree of multiplexing can be decreased by increasing the optical wavelength spacing of a plurality of signal channels. This has the effect of reducing costs for the system components. WDM processing with a lower degree of multiplexing is called coarse wavelength division multiplexing (CWDM). In a CWDM system, inexpensive optical components can be used.

In WDM systems, and in particular CWDM systems, a variety of different media signals communicated on cables including coaxial, twisted pair (shielded and unshielded), and optical, may be converted to, for example, a standard optical format. WDMs including CWDMs are utilized to process these signals for transmission over fiber networks. In the case of multimode signals on fiber optic cables, WDMs can be used to process the signals for transmission on a multiplexed single cable system including a single mode fiber.

Because WDM systems involve multiplexing of multiple signals on multiple cables, there is a need for cable management. In addition, there is a need to provide modularity to allow for ease in upgrading to additional capacity when desired. Further, it is desirable to provide thermal management to dissipate heat generated by the WDM systems.

SUMMARY

The present invention concerns wavelength division multiplexed optical networks.

According to one aspect, the invention relates to a WDM optical system including a media converter module including a plurality of converter cards, each converter card being configured to convert a native signal into an optical signal, and a panel bracket defining an opening and a plurality of fingers. The system also includes a cable management panel including a drawer defining an interior space, wherein the cable management panel includes a splitter/combiner module mounted in the interior space, and wherein the cable management panel is positioned in the opening of the panel bracket so that a space is defined between the cable management panel and the media converter module.

According to another aspect, the invention relates to a WDM optical system including a media converter module including a plurality of converter cards, each converter card being configured to convert a native signal into an optical signal, and a panel bracket defining an opening and a plurality of fingers. The system also includes a cable management panel including a drawer defining an interior space, wherein the cable management panel includes a splitter/combiner module mounted in the interior space, wherein the cable management panel is positioned in the opening of the panel bracket so that a space is defined between the cable management panel and the media converter module, and wherein the drawer includes at least one take-up mechanism. The cables coupling the media converter module to the splitter/combiner module extend vertically downward through the fingers, horizontally across a top surface of the cable management panel, and into the drawer through the take-up mechanisms.

According to yet another aspect, the invention relates to a system including a rack and first and second WDM systems coupled to the rack. Each WDM system includes a media converter module including a plurality of converter cards, each converter card being configured to convert a native signal into an optical signal, a panel bracket defining an opening and a plurality of fingers, a cable management panel including a drawer defining an interior space, wherein the cable management panel includes a splitter/combiner module mounted in the interior space, and wherein the cable management panel is positioned in the opening of the panel bracket so that a space is defined between the cable management panel and the media converter module. The cable management panel of the first WDM system is spaced apart from the media converter module of the second WDM system.

According to another aspect, the invention relates to a WDM optical system including a media converter module including a plurality of converter cards, each converter card being configured to convert a native signal into an optical signal, a panel bracket defining a plurality of fingers, and a cable management panel including a drawer defining an interior space, wherein the cable management panel includes a splitter/combiner module mounted in the interior space, and wherein the cable management panel is positioned so that a space is defined between the cable management panel and the media converter module.

According to another aspect, the invention relates to a bracket including a main body defining an opening, and first and second ends configured to be coupled to a rack, and a plurality of cable management fingers positioned above the opening in the main body.

According to yet another aspect, the invention relates to a cable management system including a bracket including a main body defining an opening, and first and second ends configured to be coupled with a rack, and a plurality of cable management fingers positioned about the opening in the main body, and a cable management panel including a drawer, the panel being positioned to extend through the opening of the bracket.

According to another aspect, the invention relates to a media converter module including a main chassis defining a plurality of slots and a front surface, a plurality of converter cards configured to slid into and out of the slots such that ports on the converter cards generally align with the front surface of the chassis, the converter cards being configured to convert native signals into optical signals, and a backplane configured to be coupled to each of the converter cards. The media converter module also includes a power supply to supply power to each of the converter cards through the backplane, and at least two brackets coupled to the chassis, wherein the brackets offset the media converter module such that the brackets extend beyond the front surface of the chassis.

DETAILED DESCRIPTION

Referring now to FIGS. 1-6, an example WDM optical system 100 is shown. System 100 generally includes a media converter 110, a cable management panel 130, and a panel bracket 150 that is coupled to the panel 130. System 100 multiplexes a plurality of channels of native optical or copper media on an optical link. The optical link, in turn, can be connected to a remote WDM system that de-multiplexes the optical link and converts the signals back into a plurality of channels of native media.

Figure 1:
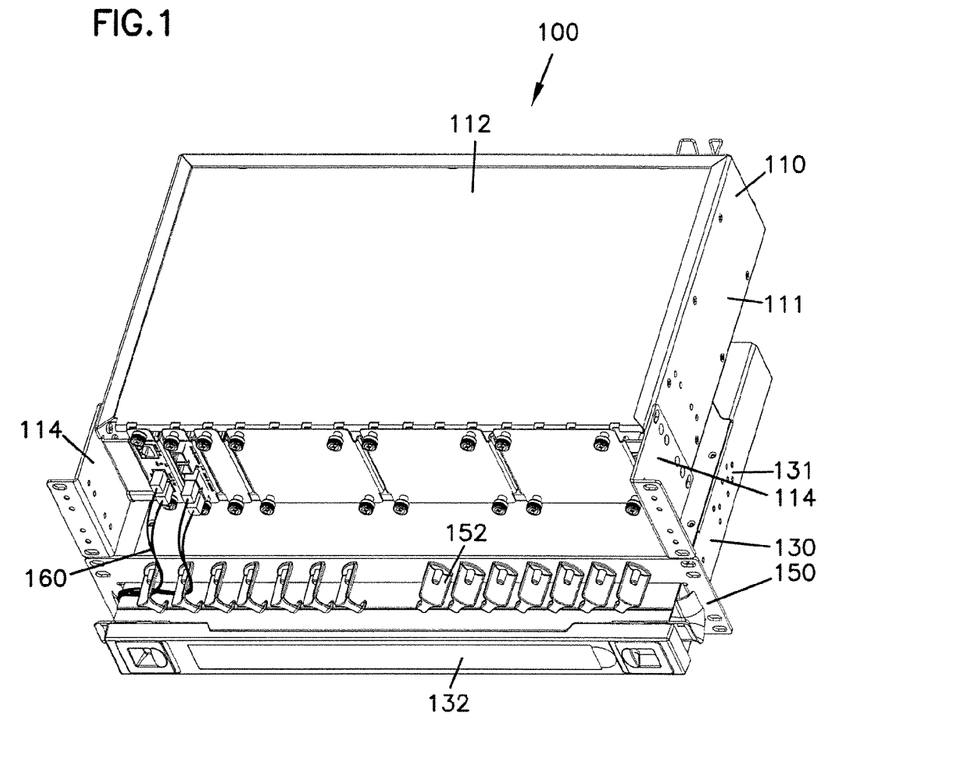
FIG. 1 is a perspective view of an example embodiment of a WDM optical system.
Figure 1A:
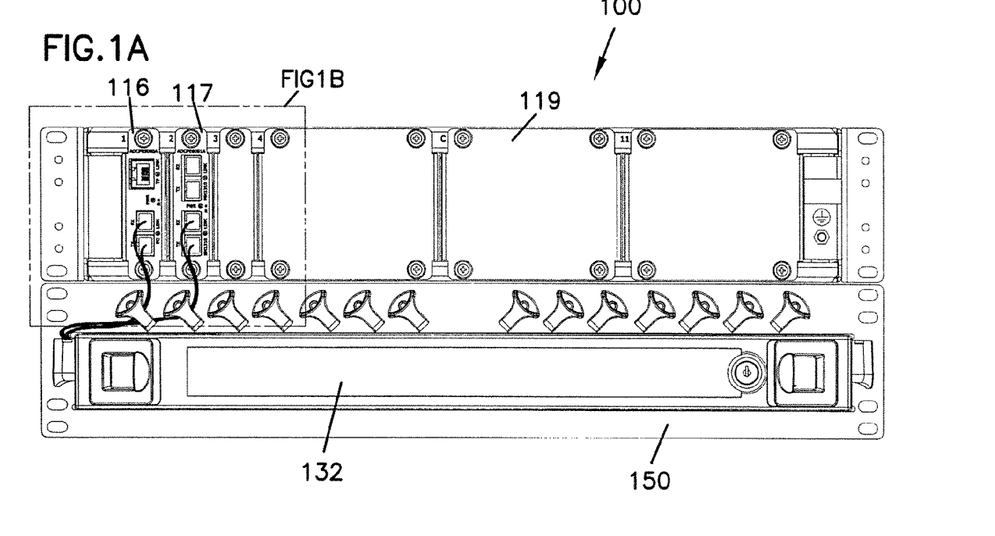
FIG. 1A is a front view of the WDM optical system of FIG. 1.
Figure 1B:
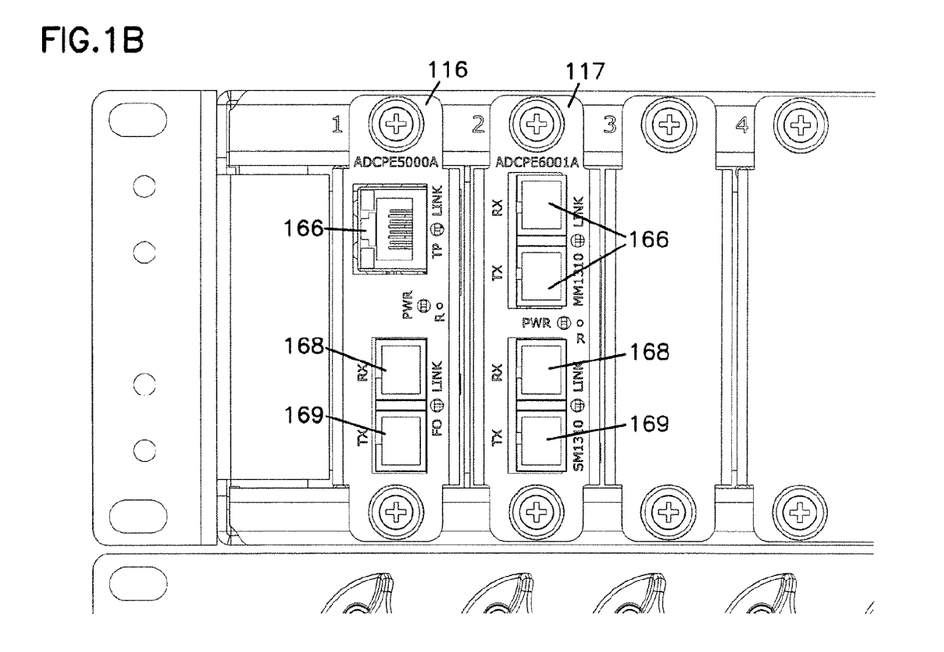
FIG. 1B is an enlarged view of a portion of the WDM optical system of FIG. 1A with cables removed for purposes of clarity.
Figure 2:
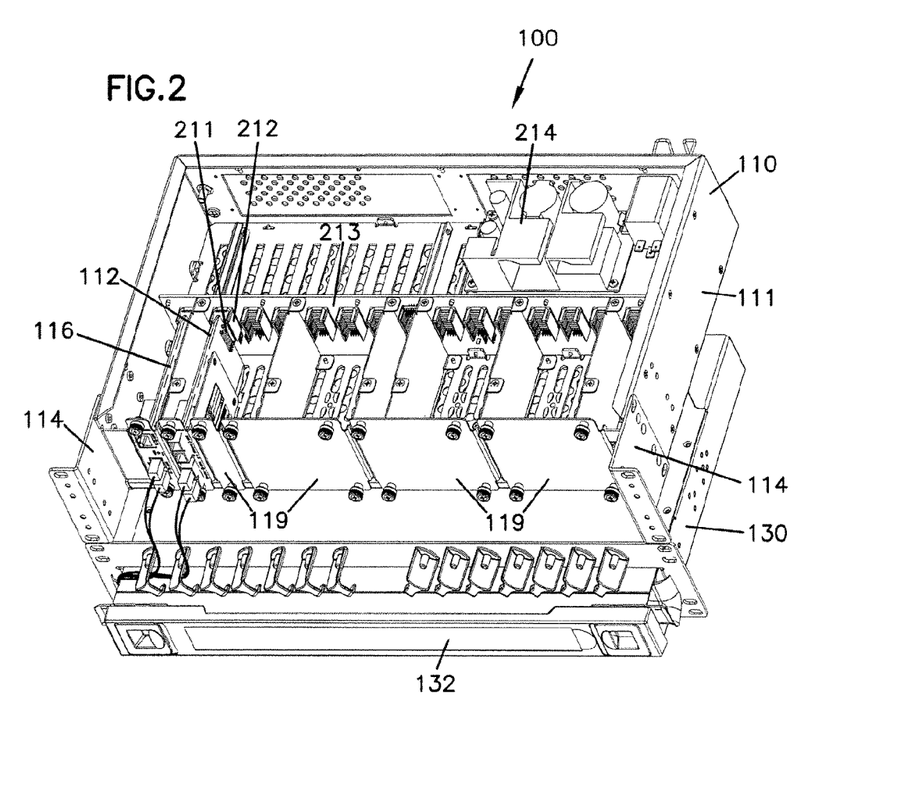
FIG. 2 is a perspective view of the WDM optical system of FIG. 1 with a cover of the media converter chassis removed.
Figure 4:
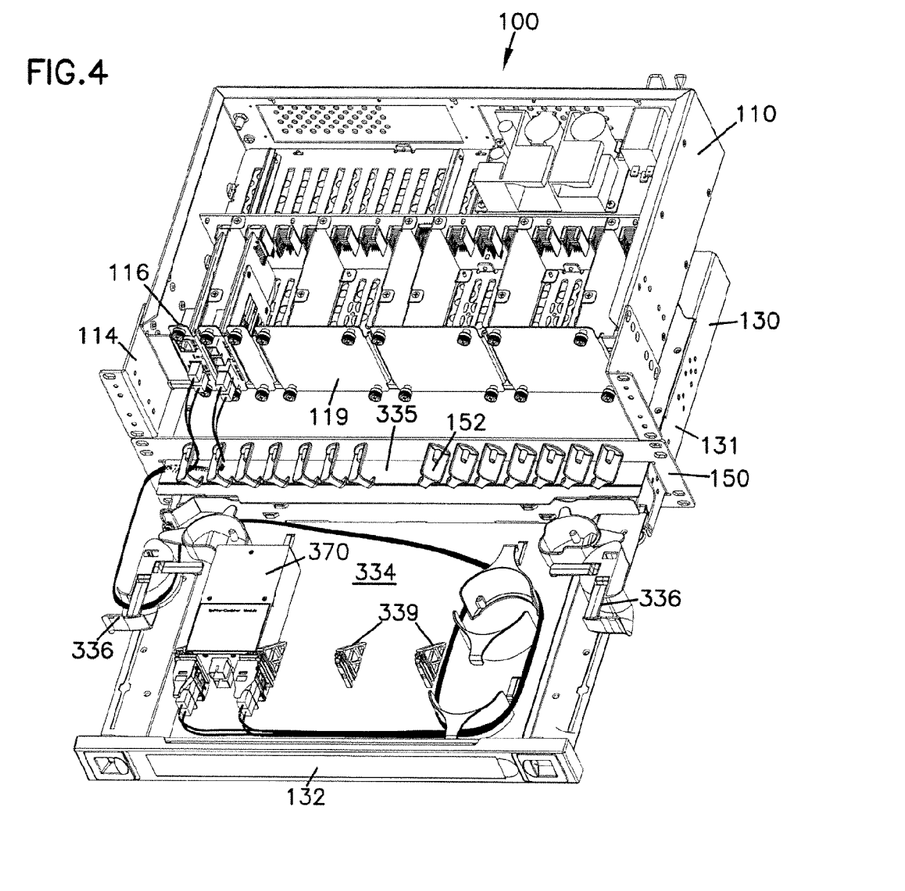
FIG. 4 is a perspective view of the WDM optical system of FIG. 3 with the cover of the media converter chassis removed.
Figure 5:
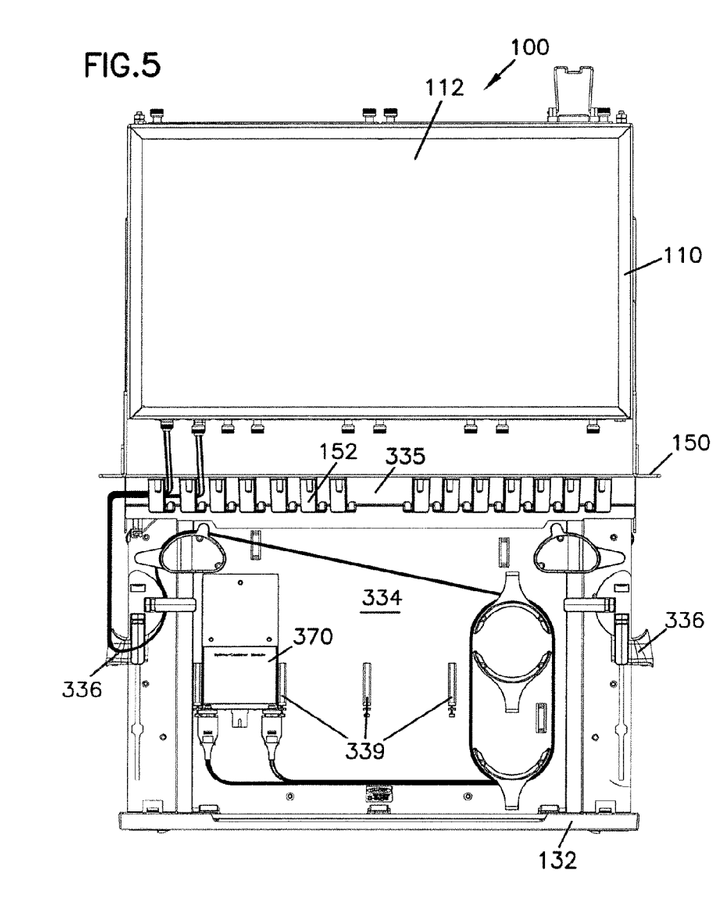
FIG. 5 is a top view of the WDM optical system of FIG. 3.
Figure 6:
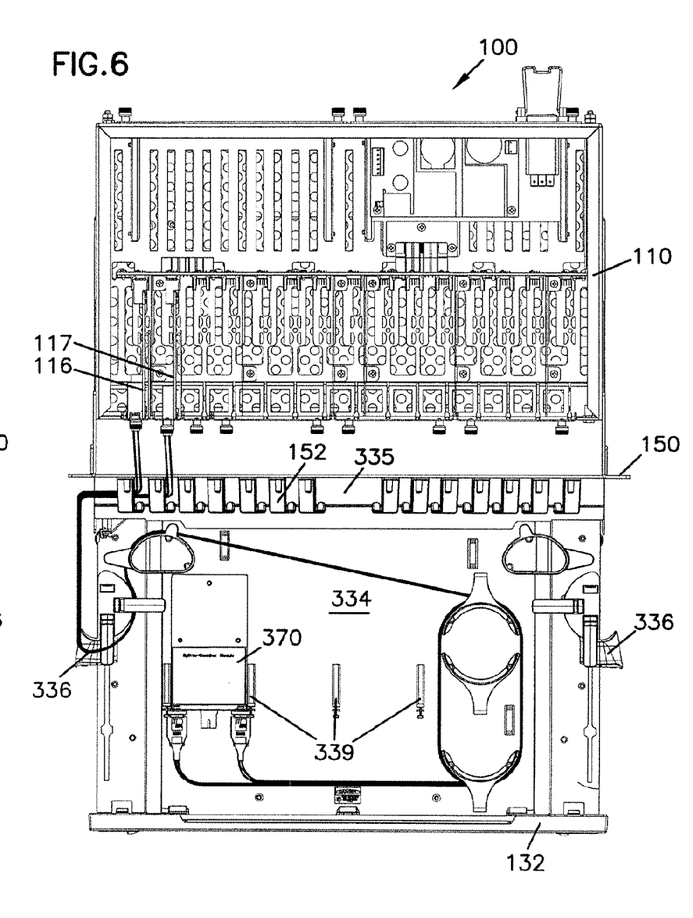
FIG. 6 is a top view of the WDM optical system of FIG. 5 with the cover of the media converter chassis removed.
Figures 7, 8, 9:
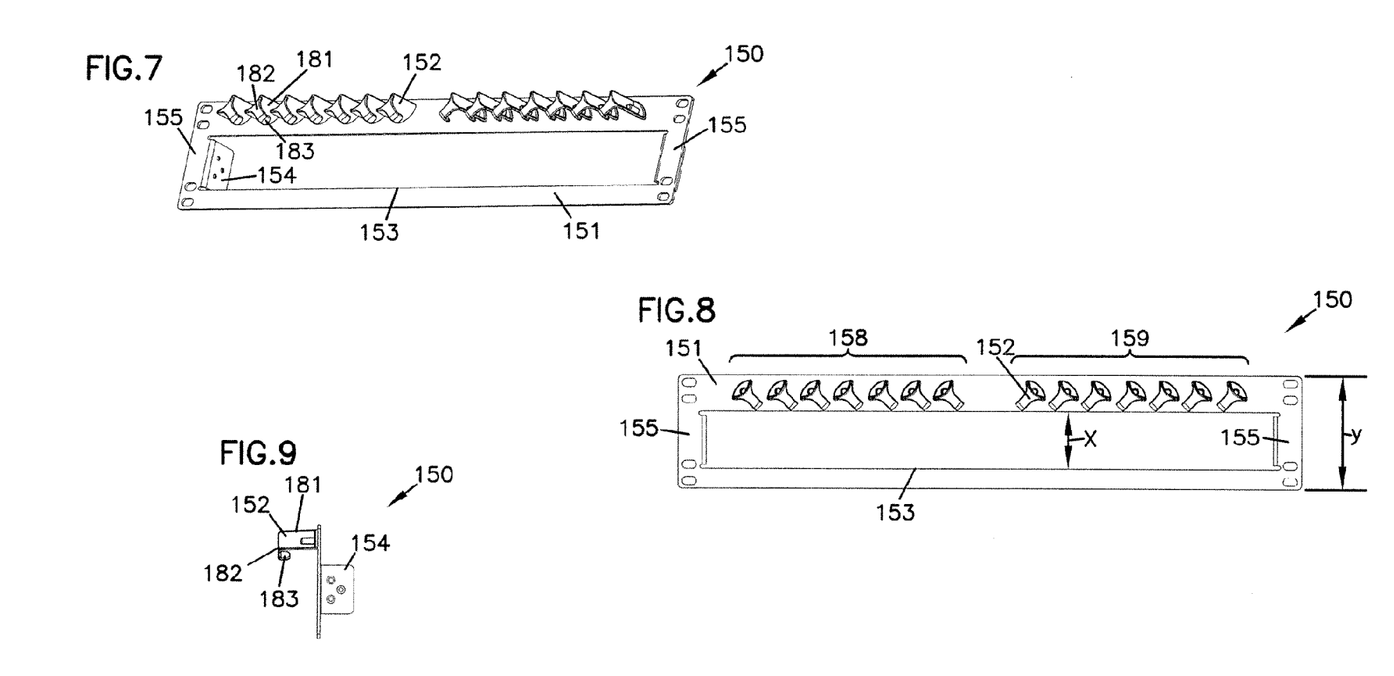
FIG. 7 is a perspective view of an example embodiment of a cable management bracket.
FIG. 8 is a front view of the bracket of FIG. 7.
FIG. 9 is a side view of the bracket of FIG. 7.
Figure 10:
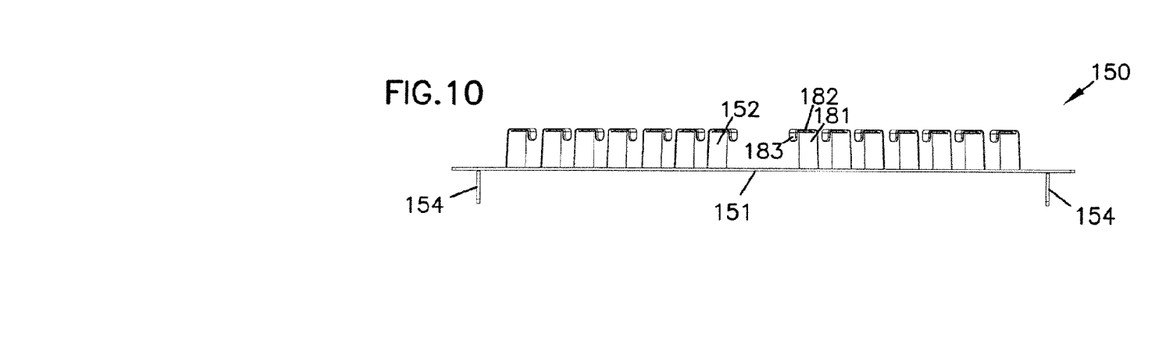
FIG. 10 is a bottom view of the bracket of FIG. 7.
Figure 11:
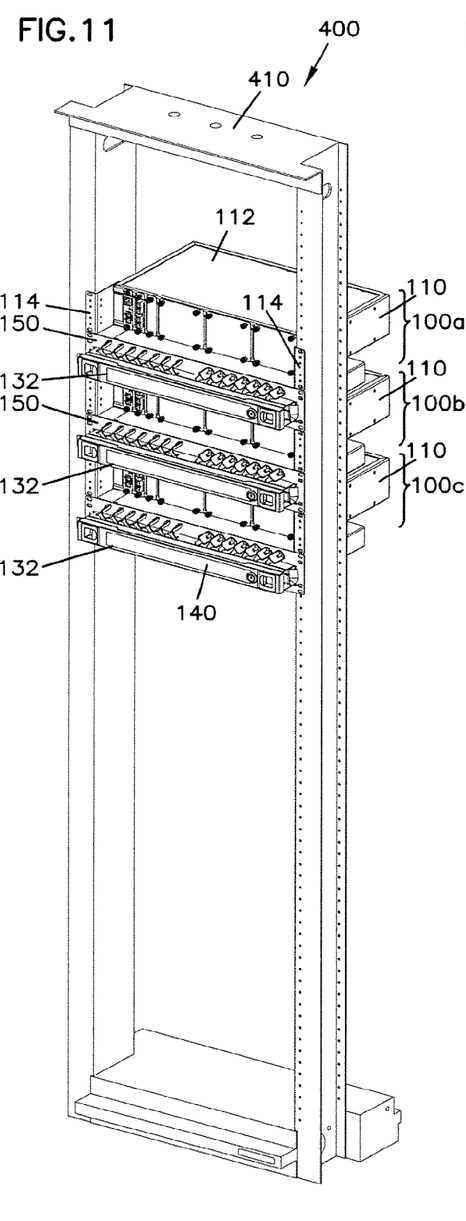
FIG. 11 is a perspective view of an example embodiment of a WDM system including a plurality of WDM optical systems mounted to a rack.

Referring now to FIGS. 2, 4, and 6, media converter 110 is shown with a cover 112 removed. Media converter 110 includes a main chassis 111 that can be coupled to a rack using brackets 114. See FIGS. 11 and 12.

Chassis 111 of media converter 110 includes slots for a plurality of converter cards, such as cards 116 and 117. Each card 116 and 117 includes one or more native ports 166, an optical-in port 168, and an optical-out port 169. See FIGS. 1A and 1B. Native ports 166 can accept a variety of different connector styles used for electric and optic cables such as, for example, RJ-type connectors, coaxial-type connectors, and optical connectors.

Cards 116 and 117 are slid into slots formed in chassis 111 of media converter 110. Each card 116 and 117 includes an edge contact 211 that is plugged into card edge connector 212 provided on a backplane 213 as the card is inserted into chassis 111. Power from one or more power supplies 214 is provided to each card 116 and 117 through backplane 213. Although the example chassis 111 provides slots for as many as fourteen converter cards and one CPU card, only two cards 116 and 117 are illustrated. Blanks 119 of varying sizes are used to cover the openings for the unused slots on chassis 111.

Cards 116 and 117 convert native signals provided at native ports 166 into optical signals provided at optical-out ports 169. For example, card 116 includes native port 166 configured as an RJ-type port, and card 117 includes native ports 166 configured as multi-mode optic-type ports. Native port 166 of card 116 receives a plug on the end of a twisted pair cable. Native ports 166 of card 117 receive fiber optic connectors on the end of fiber optic cables.

Each card 116 and 117 preferably converts the native signal into an optical signal at a given wavelength different from that of each other card in chassis 111. For example, card 116 converts a native signal into an optical signal at a wavelength of 1270 nanometers, while card 117 converts a native signal into an optical signal at a wavelength of 1290 nanometers. This allows multiple optical signals of different wavelengths to be multiplexed onto a single optical link, as described further below. In the example shown, up to fourteen cards can be used at different wavelengths ranging from 1270 nanometers to 1610 nanometers spaced at increments of 20 nanometers. Other wavelengths and spacing can also be used.

In addition, cards 116 and 117 convert optical signals provided at optical-in ports 168 into native signals that are provided at native ports 166.

Referring now to FIGS. 3-6, cable management panel 130 is illustrated in greater detail. Panel 130 includes a frame 131 defining a top surface 335, and a drawer 132. Drawer 132 can move from a closed position (FIGS. 1 and 2) to an open position (FIGS. 3-6). The inside portion of drawer 132 can accept various trays, including illustrated tray 334.

Drawer 132 provides cable management for the cables 160. For example, drawer 132 includes movable take-up mechanisms 336 positioned at either side of drawer 132 that manage cables 160 entering and exiting drawer 132. Specifically, the take-up mechanisms 336 slide relative to the drawer 132 to manage slack in the cables 160 as the drawer 132 is opened and closed. Further, tray 334 in drawer 132 includes a plurality of radius limiters 338 that manage cable flexing, excess cable, and the routing of cables 160 in the drawer 132. Additional details regarding panel 130 can be found in U.S. Pat. No. 6,504,988 to Trebesch et al.; U.S. Pat. No. 6,748,155 to Kim et al.; and U.S. Patent Application Publ. No. 2003/0007767 to Douglas et al., all of which are hereby incorporated by reference in their entireties.

Drawer 132 also includes a splitter/combiner module 370 mounted therein. Module 370 is mounted to tray 334 by two sliding adapter arrangements 339. A second set of sliding adapter arrangements 339 is provided to accommodate another splitter/combiner module in alternate embodiments. The sliding adapter arrangements 339 allow the module 370 to be raised (see FIG. 3A) and lowered (FIG. 3) to allow for ease in accessing the ports located at a front surface of module 370, as well as removal and placement of module 370 in drawer 132. Additional details regarding the sliding adapter arrangements 339 can be found in U.S. Pat. No. 6,504,988 to Trebesch et al.

Figure 3:
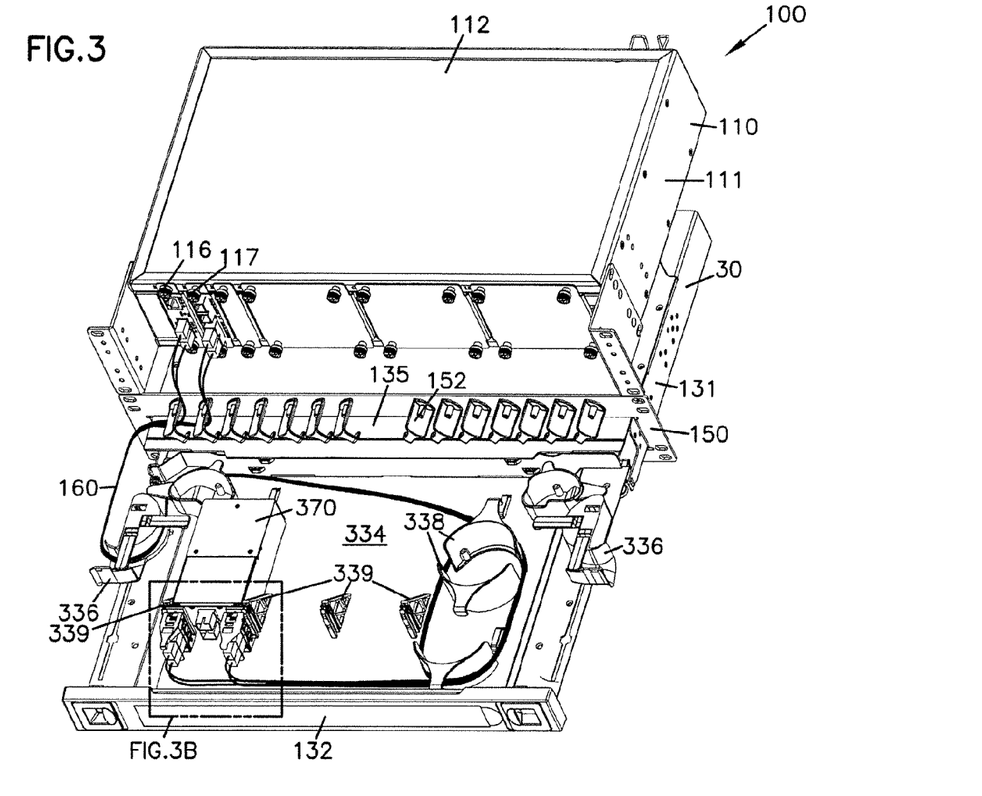
FIG. 3 is a perspective view of the WDM optical system of FIG. 1 with a drawer of the cable management panel in an open position.
Figure 3A:
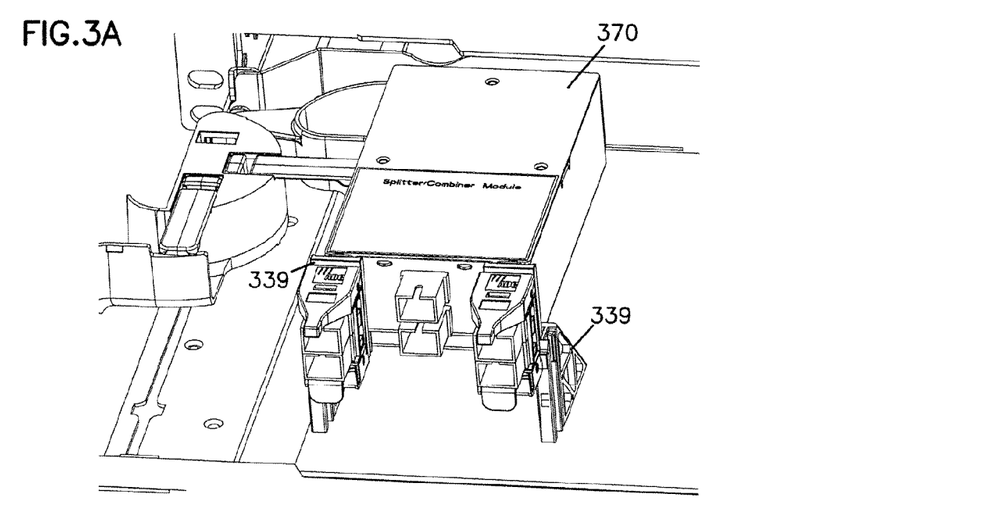
FIG. 3A is an enlarged view of a portion of the WDM optical system of FIG. 3 with the example splitter/combiner module in a raised position and with cables removed for purposes of clarity.
Figure 3B:
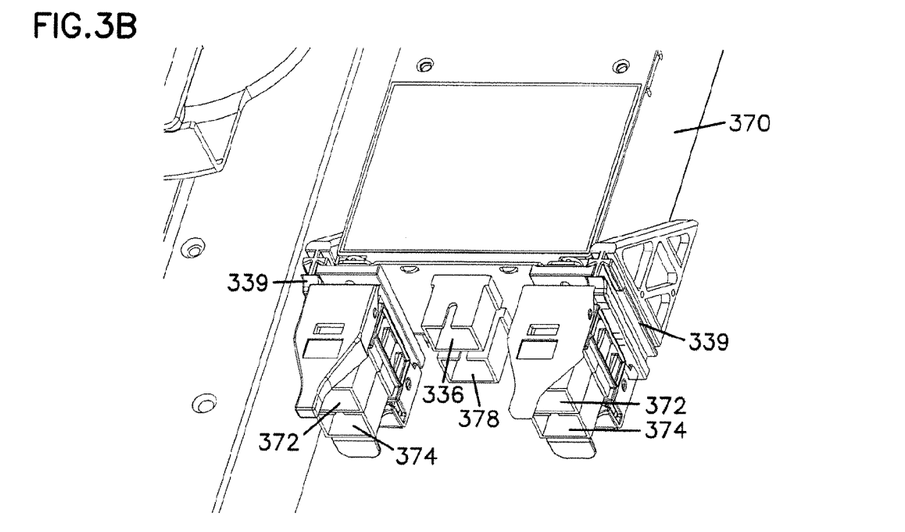
FIG. 3B is an enlarged view of a portion of the WDM optical system of FIG. 3 with cables removed for purposes of clarity.

As shown in FIG. 3B, module 370 includes two sets of optical-in ports 372 and optical-out ports 374. Module 370 also includes link-input port 376 and link-output port 378. Module 370 generally functions to combine (multiplex) multiple optical signals onto one or more optical links. For example, module 370 can multiplex optical signals for multiple cards of the media converter 110 (e.g., cards 116 and 117) onto a single optical link. Module 370 also functions to split (de-multiplex) optical signals from one or more optical links into multiple optical signals.

In one embodiment, module 370 includes an 8 channel CWDM having part number C-80-A-B-0-S-8-1-B-55 manufactured by Cube Optics AG of Germany. In addition, although only one module 370 is shown in the illustrated embodiment, additional modules 370 can be added to drawer 132. For example, the example media converter 110 is configured to convert up to fourteen native signals into optical signals that can be multiplexed. Therefore, two or more splitter/combiner modules each multiplexing two or more signals can be placed in drawer 132.

Referring now to FIGS. 7-10, panel bracket 150 is shown in isolation. Bracket 150 includes a main body 151 and an opening 153. In the illustrated embodiment, opening 153 is sized to receive panel 130. Brackets 154 extending from main body 151 are used to couple bracket 150 to panel 130 (see FIG. 14). In addition, end portions 155 can be used to mount bracket 150 to a rack (see FIG. 11).

A plurality of cable management fingers 152 extends from a front surface of bracket 150. In the illustrated embodiment, each finger 152 includes a first portion 181 extending from the surface of bracket 150, a second portion 182 extending generally perpendicularly from the first portion 181, and a third portion 183 extending back towards the surface of bracket 150. See FIGS. 7, 9, and 10. Portions 181, 182, and 183 generally form a "C" shape that functions to capture and maintain cables running therethrough. The shape and angle of fingers 152 also function to protect the cables from sharp bends as the cables extend vertically downward from media converter 110 and horizontally along surface 335 of panel 130.

In the illustrated embodiment, fingers 152 form two banks 158 and 159 that allow dressing of cables in two directions. Specifically, fingers 152 of bank 158 are directed at approximately a 45-degree angle downward from horizontal and toward bank 159, and fingers 152 of bank 159 are directed at approximately a 45-degree angle downward from horizontal and toward bank 158. This configuration allows cables 160 extending vertically downward from the media converter 110 on the right side to be dressed through bank 158 and extend towards the right edge of panel 130, while allowing cables 160 extending downward on the left side to be dressed through bank 159 and extend towards the left edge of panel 130. Allowing the cables to be dressed in both the right and left directions reduces the amount and length of cable extending in each direction. In alternative embodiments, all of the cables can be dressed in one direction.

In one example, bracket 150 has a height Y of approximately two rack units (RUs), while the opening 153 has a height X of approximately one RU to accept panel 130. In the illustrated embodiment, the opening 153 is positioned at approximately a mid-portion of the main body 151 of bracket 150.

Card 116 of media converter module 110 is coupled to splitter/combiner module 370 as follows. A native signal is provided at native port 166 of card 116. Optical-in port 168 and optical-out port 169 of card 116 are coupled to optical-out port 374 and optical-in port 372 of splitter/combiner module 370 using two cables 160. In the illustrated embodiment, cables 160 extend from card 116 through fingers 152 on bracket 150. The cables 160 then run along top surface 335 of panel 130 toward an edge of panel 130, and the cables enter panel 130 through the take-up mechanism 336 at the respective edge of panel 130. Card 117 is coupled to module 370 in a similar manner.

Splitter/combiner module 370 is coupled to a remote system by one or more optical links (not shown). Specifically, link-input port 376 and link-output port 378 of module 370 are coupled to optical links which run to/from a remote location.

In use, system 100 can be used to convert signals from native format into optical format, and to multiplex multiple optical signals onto a single or multiple optical links that are linked with a remote location. For example, a native signal provided at native port 166 of card 116 is converted into an optical signal. The optical signal is communicated from optical-out port 169 of card 116 to optical-in port 372 of module 370 by cable 160. The signal is then multiplexed by module 370 and communicated to a remote system by an optical link coupled to link-output port 378 of module 370.

In a similar manner, signals can be communicated by an optical link from a remote system to system 100 as follows. First, the signal is communicated to link-input port 376 of module 370. The signal is then de-multiplexed by module 370, and the signal is communicated from optical-out port 374 of module 370 to optical-in port 168 of card 116. The signal is then converted by card 116 to native format and delivered to the native system through native port 166.

In the illustrated embodiment, cables 160 include SC-type connectors, although other types of connectors such as LC-type connectors can also be used.

Figure 12:
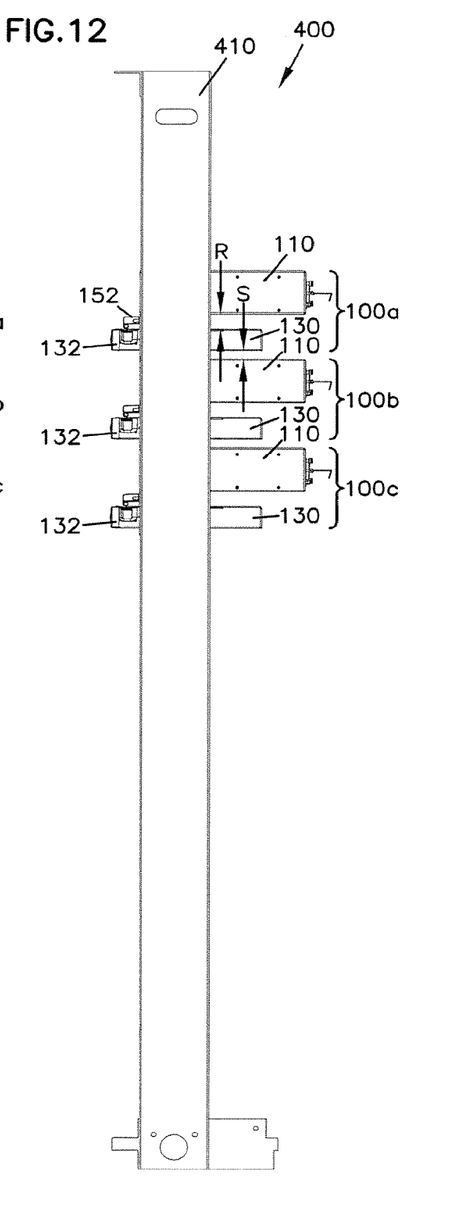
FIG. 12 is a side view of the system of FIG. 11.
Figure 13:
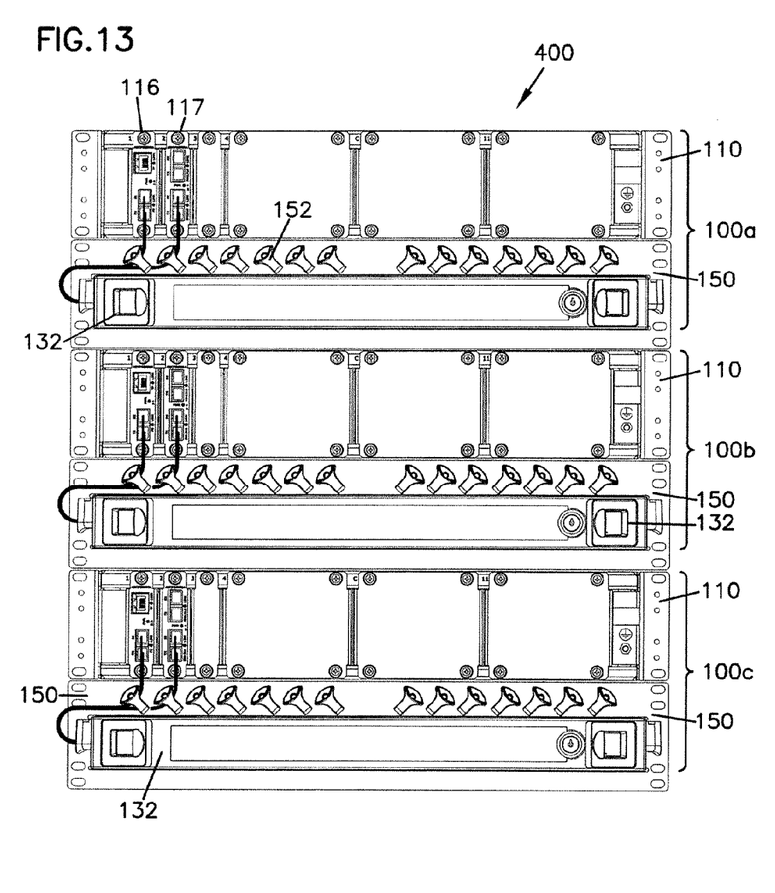
FIG. 13 is a front view of the system of FIG. 11 with the rack removed for purposes of clarity.
Figure 14:
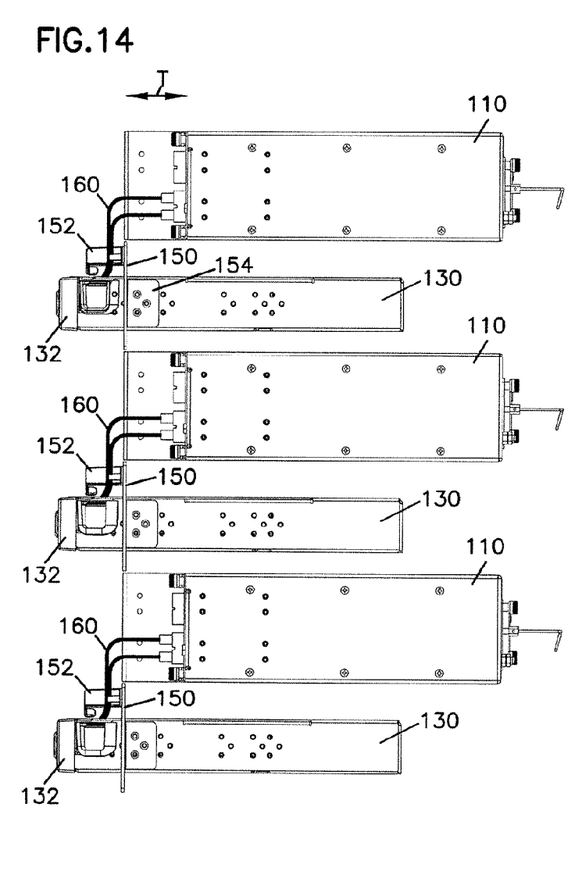
FIG. 14 is a side view of the system of FIG. 13.

Referring now to FIGS. 12-14, an example embodiment of a system 400 is shown including a rack 410 and three WDM optical systems 100a, 100b, and 100c. Each system 100a, 100b, and 100c is configured in a manner similar to that of system 100 described above.

In the example shown, media converter 110 is spaced a distance R from the cable management panel 130 of each respective system 100a, 100b, and 100c. In addition, cable management panel 130 of each system 100a, 100b, and 100c is spaced a distance S from the media converter 130 of the next adjacent system. Distances R and S are set by bracket 150 that positions panel 130 of approximately one RU in approximately the middle of a two RU space. In example embodiments, offset R is approximately 0.65 inches, and offset S is approximately 1.10 inches. Larger or smaller offsets can be used. Offsets R and S can be desirable to allow vertical airflow into chassis 111 of media converters 110 to dissipate heat generated within media converters 110.

Brackets 114 used to couple media converts 100a, 100b, and 100c to rack 410 allow the media converters 100a, 100b, and 100c to be offset rearward a distance T from a front surface of the rack 410. See FIG. 14. In one embodiment, the offset T is approximately two inches.

It can be desirable to offset the media converters 100a, 100b, and 100c in this manner so that the connectors of cables 160 do not extend beyond the front surface of rack 410, where the connectors could be easily dislodged. See FIG. 14. In addition, the offset allows the cables extending from the connectors to be dressed vertically downward through fingers 152 of panel bracket 150 and right or left along top surface 335 of panel 130 into drawer 132.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A WDM optical system comprising:
a media converter module including a plurality of converter cards, each converter card being configured to convert a native signal into an optical signal;
a panel bracket defining an opening and a plurality of fingers, the panel bracket completely surrounding the opening; and
a cable management panel including a drawer defining an interior space, wherein the cable management panel includes a splitter/combiner module mounted in the interior space, and wherein the cable management panel is separate from and positioned in the opening of the panel bracket so that the panel bracket completely surrounds the cable management panel, and a space is defined between the cable management panel and the media converter module.

2. The system of claim 1, further comprising at least one take-up mechanism positioned within the drawer.

3. The system of claim 1, wherein the plurality of fingers includes a first group angled in a first direction and a second group angled in a second direction.

4. The system of claim 3, wherein the first direction extends generally towards a first end of the panel bracket, and the second direction extends generally towards an opposite second end of the panel bracket.

5. The system of claim 1, further comprising at least two brackets coupled to a chassis of the media converter module, wherein the brackets offset the media converter module such that the brackets extend beyond the front surface of the chassis.

* * * * *